United States Patent Office 2,807,282
Patented Sept. 24, 1957

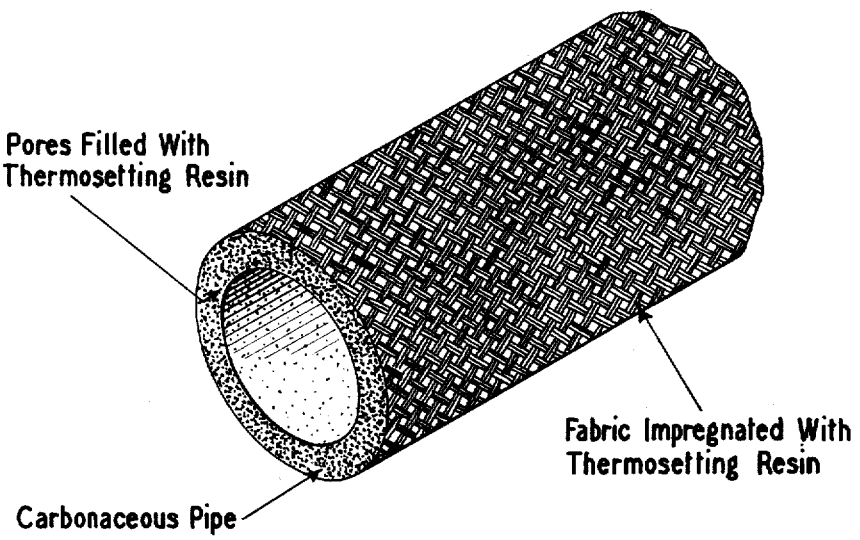

---

2,807,282

REINFORCED CARBONACEOUS PIPE AND METHOD OF MAKING SAME

Willie H. Watts, Avon Lake, Ohio, and Robert P. Stambaugh, Grand Island, N. Y., assignors to Union Carbide Corporation, a corporation of New York Application February 17, 1954, Serial No. 410,930

6 Claims. (Cl. 138—76)

---

This invention relates to carbonaceous pipe or tubing. More particularly, this invention relates to resin-impregnated, fabric-bonded, carbonaceous pipe or tubing having fluid imperviousness and of high mechanical strength.

Carbonaceous pipe or tubing is known in industries where advantage may be taken of its properties of heat resistance and corrosion resistance. However, these advantageous properties are accompanied by two disadvantageous properties, fluid perviousness and low mechanical strength, that necessarily restrict the application and use of cabonaceous pipe. Of these two disadvantageous properties, the fluid perviousness has been overcome by introducing resins into the pores of carbonaceous pipe and converting such resins into solids, as is known in the art. But, in the present status of the art, there still remains the low mechanical strength, for although the mechanical strength is somewhat improved by such resin treatment, the resulting product is brittle and susceptible to shattering from a shock or blow. This inherent fragility presents a problem thus far unsatisfactorily solved.

It is an object of this invention to provide carbonaceous pipe or tubing that is both impervious to fluids and of high mechanical strength.

It is a further object of this invention to provide a method whereby carbonaceous articles, such as pipe or tubing, may be made both impervious to fluids and of high mechanical strength.

It is a further object of this invention to provide a method whereby fluid-impervious carbonaceous articles, such as pipe or tubing, may be made of high mechanical strength.

The invention by means of which these objects are achieved comprises, in combination, carbonaceous pipe, a continuous and closely fitting fibrous sleeving permanently affixed on the external surface of said carbonaceous pipe, and a synthetic resin which has been converted in situ from a fusible state to an infusible form, as for example, by a polymerization or condensation reaction that may desirably be promoted by heating or catalysts, said resin being present in the pores of said carbonaceous pipe, on the surface thereof, and in the interstices between the fibers of said woven, fibrous sleeving. The sleeving may be bonded to the pipe which has previously been rendered fluid impervious by impregnation with a suitable resin, particularly one that is convertible to infusible form, or the sleeving may be bonded to the pipe with a resin that both renders the pipe impervious to fluids and bonds the sleeving thereto. For some applications, if desired, more than one resin may be used, for example, a phenol-formaldehyde resin and a furan resin. Examples of classes of other synthetic resins capable of being converted to an infusible form include, among others, phenol-aldehyde resins; epoxy resins obtained by reaction of epichlorohydrin with a polyhydric phenol; melamine-and urea-formaldehyde resins; thermosetting alkyd resins; contact resins such as the copolymers obtained by copolymerization in presence of a peroxide catalyst of a vinyl monomer such as styrene and of an unsaturated linear polyester, as for example, a glycol maleate; thermosetting silicone polymers; furan resins including furfural-phenol condensates and resins obtained by acid catalysis of furfuryl alcohol; thermosetting ketone aldehyde resins such as acetone-formaldehyde resins.

The single figure of the drawing is a perspective view of a carbonaceous pipe embodying the invention.

Referring to the drawing:

A carbonaceous pipe is fitted on its external surface with a continuous and closely fitting fibrous sleeving, the pores of said pipe, the surface thereof and the interstices between the fibers of said sleeving all being impregnated with a fusible resin which has been converted to an infusible form after impregnation.

When a fabric is bonded to carbonaceous material by an infusible resin, the combination offers most of the advantages of each. The carbonaceous material imparts its own rigidity to the fabric and the fabric supports and protects the carbonaceous material. The benefit imparted to the carbonaceous material by the fabric is threefold: the yield point is raised, fracture propagation is reduced and, in the event of fracture, the fractured pieces of carbon tend to be maintained in their original positions. The resin, of course, renders the carbonaceous material impermeable to the passage of fluids.

The fluid-impervious, high mechanical strength pipe of the invention may be prepared by encasing carbonaceous pipe with a woven, fibrous covering, which may be in the form of a sleeve. The pipe and covering are then impregnated, at reduced and increased pressures, with a fusible resin and then converting the resin to an infusible solid, as for example, by heating. The assembly may be reimpregnated with another heat-hardenable thermosetting resin, for example, a first impregnation with a phenol-formaldehyde resin followed by a second impegnation with a furfural resin. In order to accelerate polymerization of the resin or resins to infusible form, any suitable catalyst may be used, for example, a water-soluble basic agent such as sodium hydroxide, sodium carbonate, or the like, as a catalyst for the phenol-formaldehyde resins, and the aryl sulfonic acids and sulfonyl chlorides or the like, for the furan resins. The pipe of the invention may also be prepared by using commercially available impervious carbonaceous pipe. When such impervious pipe is used, it is encased with a woven, fibrous covering, which may be in the form of a sleeve. The pipe and covering are then coated until saturated by any suitable means, for example, by use of a brush, with a washcoat containing a fusible resin and the resin converted to an infusible solid, as for example, by heating.

The washcoat contains a fusible resin in a volatile solvent, it may contain a catalyst as suggested before, and also may contain a small amount of a carbonaceous material such as lampblack. The volatile solvent functions primarily as a carrier for the resin and the concentration of the resin in the solvent is not critical, the requirement being that the viscosity of the washcoat be suitable for application to the pipe and covering.

A preferred method of making carbonaceous articles such as pipe or tubing impervious to fluids and of high mechanical strength according to the invention is set forth as follows: Carbonaceous pipe of suitable diameter is disposed vertically, a cone-shaped spreader is placed on the upper end thereof and braided glass sleeving of suitable size is drawn over the spreader and pipe assembly. Preferably, the fibers of the woven sleeving are at about 45° angles with reference to the longitudinal axis of the pipe. The sleeving is then smoothed over the carbonaceous pipe and bound at both ends to the pipe with wire.

The pipe and sleeving are placed in a wooden trough to prevent snagging of the sleeving and the entire assembly placed in an impregnating vessel. A vacuum is drawn on the impregnating vessel containing the assembly and held at an absolute pressure of approximately 10 mm. Hg for fifteen minutes. A thermosetting phenol-formaldehyde resin is then introduced into the impregnating vessel so as to cover the assembly, the pressure then being increased to 80 pounds per square inch and held at that pressure for two hours, at the end of which period the assembly is removed and placed in a curing autoclave. The curing cycle consists of about 8 hours at about 90° C. followed by about 3 hours at about 150° C. under a pressure of about 80 pounds per square inch. Optionally, the assembly may then be impregnated in the same manner with a furan resin, placed in a curing autoclave and cured at a temperature cycle of about 3 hours from room temperature to about 150° C., followed by a hold period of about 3 hours at about 150° C.

As stated above, impervious carbonaceous pipe is available commercially and such pipe may be treated so as to make it of high mechanical strength according to the invention in the following example: A length of resin-impregnated impervious carbonaceous pipe is disposed vertically, a cone-shaped spreader is placed on the upper end thereof and braided glass sleeving of suitable size is drawn over the spreader and pipe assembly. The sleeving is then smoothed over the pipe and bound at both ends to the pipe with wire. The sleeving-encased pipe is then brushed until saturated with a thermosetting resin washcoat. A coating that has given satisfactory results has the composition, by weight; 100 parts thermosetting, phenol-formaldehyde resin, 1 part lampblack, and acetone sufficient to form a thin brushing solution. The sleeving-encased pipe is aged for about 4 hours at room temperature, then cured for about 12 hours at about 80° C., the heat being provided by infra-red lamps.

It is to be noted that the present invention is not confined to the use of glass sleeving nor of phenolformaldehyde resins or furan resins. Sleeving of forms other than woven and of materials other than glass may be used, as may any resin capable of penetrating the pores of the carbonaceous pipe so long as the resin both renders the pipe impervious to fluids and bonds the sleeving thereto. Other materials will readily be suggested to those skilled in the art, all coming within the scope of the invention.

Demonstrating the success of the invention, a 12 inch span of 2 inch diameter (1½ inches inside diameter) resin-impregnated graphite pipe failed with an average center load of 900 pounds. Pipe of the same dimensions, when treated according to the method of the invention, failed with an average center load of 1150 pounds. In these tests the resin-impregnated pipe failed completely and fell out of the testing jig, whereas the pipe treated according to the method of the invention merely sagged in the jig and the parts maintained their original relative positions. The reduction of fracture propagation may be demonstrated by striking a solid object with the resin-impregated pipe and the pipe treated according to the method of the invention. In the case of the resin-impregnated pipe the fracturing occurs over an extensive area and many small pieces are produced, with the pipe of the invention the failure is localized to the immediate vicinity of the point of loading, indeed instances have been observed in which the fractures have not even extended around the cross section in which failure occurred.

Related subject matter is disclosed and claimed in the application of Robert P. Stambaugh and Willie H. Watts, Serial No. 410,931, filed February 17, 1954.

What is claimed is:

1. An aricle of manufacture comprising, in combination, a normally fragile, porous carbonaceous pipe, a woven fibrous sleeving affixed on the external surface of said pipe, and an infusible resin, said resin being present in the pores of said pipe, on the surface thereof, and in the interstices between the fibers of said woven, fibrous sleeving.

2. An article of manufacture comprising, in combination, a porous carbonaceous pipe, a continuous and closely fitting, woven, fibrous sleeving permanently affixed on the external surface of said carbonaceous pipe, a heat-hardened phenol-formaldehyde resin and a heat-hardened furan resin and in the interstices between the fibers of said woven, fibrous sleeving.

3. An article of manufacture comprising, in combination, a porous carbonaceous pipe, a continuous and closely fitting, woven, fibrous sleeving permanently affixed on the external surface of said carbonaceous pipe, and a heat-hardened phenol-formaldehyde resin, said resin being present in the pores of said carbonaceous pipe, and on the surface and in the interstices between the fibers of said woven, fibrous sleeving.

4. An article of manufacture comprising, in combination, a porous carbonaceous pipe, a continuous and closely fitting, woven glass fabric sleeving permanently affixed on the external surface of said carbonaceous pipe, and an infusible resin, said resin being present in the pores of said carbonaceous pipe, on the surface thereof, and on the surface and in the interstices between the fibers of said woven glass fabric sleeving.

5. The method of manufacturing impervious mechanically reinforced carbonaceous pipe, which method comprises applying on a carbonaceous pipe section a fibrous casing snugly fitting the exterior thereof; applying a heat hardenable resin to said casing in sufficient quantity to fill interstices between the fibers thereof, to coat the outer surfaces of said pipe section, and to fill adventitious openings therein; and curing said resin in situ and thereby bonding said casing to said pipe section, providing on at least the surface of said pipe section a skin impervious to fluids, and providing mechanical reinforcement for said pipe section.

6. A method according to claim 5 wherein said carbonaceous pipe section is impregnated with a heat hardenable resin and rendered fluid-impervious prior to the application of said snugly fitting fibrous casing.

References Cited in the file of this patent

UNITED STATES PATENTS

| 1,065,495 | Aylsworth | June 24, 1913 |
| 1,620,940 | Bleeker | Mar. 15, 1927 |
| 2,174,887 | Kiefer | Oct. 3, 1939 |
| 2,296,781 | Farny | Sept. 22, 1942 |
| 2,354,090 | Stamm et al. | July 18, 1944 |
| 2,510,941 | Ake | June 13, 1950 |
| 2,611,721 | Brees | Sept. 23, 1952 |
| 2,653,118 | Seymour | Sept. 22, 1953 |

FOREIGN PATENTS

| 721,211 | Great Britain | Jan. 5, 1955 |

UNITED STATES PATENT OFFICE

CERTIFICATE OF CORRECTION

Patent No. 2,807,282                                         September 24, 1957

Willie H. Watts et al.

It is hereby certified that error appears in the printed specification of the above numbered patent requiring correction and that the said Letters Patent should read as corrected below.

Column 4, line 17, after "resin" insert -- in the pores of said carbonaceous pipe --.

Signed and sealed this 26th day of November 1957.

Attest:

KARL H. AXLINE
Attesting Officer

ROBERT C. WATSON
                                                       Commissioner of Patents